March 10, 1931.  W. C. MARTIN  1,795,659
WHEEL CONSTRUCTION
Filed June 20, 1927
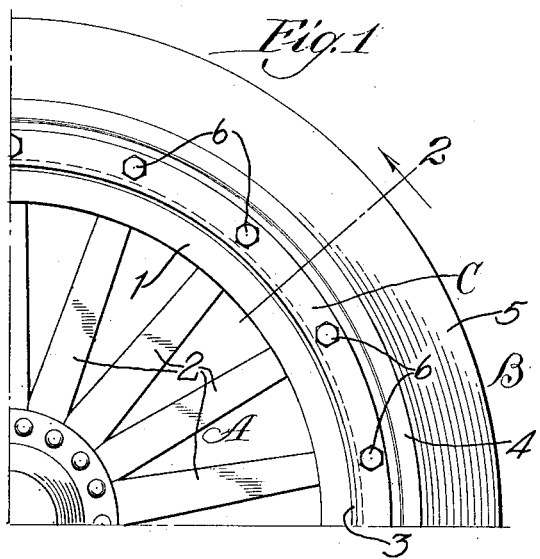
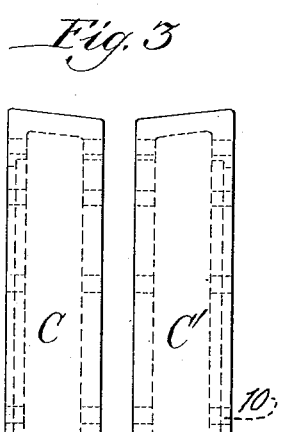
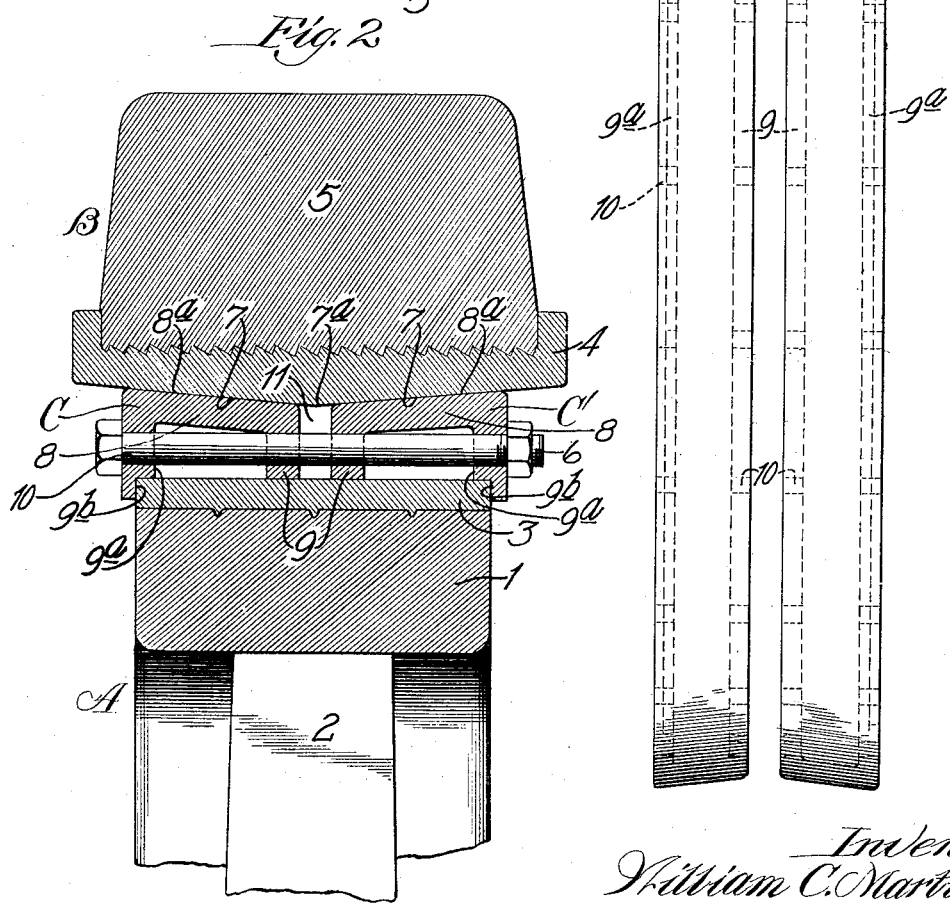
Inventor
William C. Martin,
By Dyrenforth, Lee, Chritton & Wiles,
Attys.

Patented Mar. 10, 1931

1,795,659

UNITED STATES PATENT OFFICE

WILLIAM C. MARTIN, OF MILWAUKEE, WISCONSIN

WHEEL CONSTRUCTION

Application filed June 20, 1927. Serial No. 199,954.

This invention relates particularly to wheels equipped with rubber tires.

The primary object is to provide an improved means for securing the tire upon the rim of a wheel-center.

One method heretofore employed for securing a rubber tire, or a cushion tire, upon a wheel-center is that of forcing the wheel-center into position within the tire under heavy hydraulic pressure. In accordance with the present invention, the tire may be securely connected with the wheel-center in an improved manner, permitting removal when necessary for the purpose of renewing the tire.

The invention is illustrated in a preferred embodiment in the accompanying drawing, in which—

Fig. 1 is a broken elevational view of a wheel constructed in accordance with the invention; Fig. 2, a broken sectional view on an enlarged scale taken as indicated at line 2 of Fig. 1; and Fig. 3, a plan view of a pair of complemental clamping-rims employed.

In the illustration given, the wheel-center, designated A, comprises a felly 1, spokes 2, and a steel band 3 shrunk upon the felly; and the tire, designated B, comprises an annular steel base-rim 4 and an outer tire-member 5 of rubber mounted thereon and preferably vulcanized thereto.

The tire B is securely mounted on the wheel-center through the medium of a pair of complemental clamping-rims C and C', connected together by an annular series of bolts 6.

The tire-base 4 is shown as a heavy steel annulus whose inner circumferential surface comprises annular conical surfaces 7 which form a central apex $7^a$.

The clamping-rims C and C' are alike, but reversed in position, being thus interchangeable. Each rim has a circumferential portion 8 provided with an outer taper surface $8^a$. Also, each clamping-rim has an inner inturned flange 9 and an outer inturned flange $9^a$. The flanges $9^a$ are provided at their inner sides with annular recesses which embrace the edge-portions of the steel band 3 of the wheel center. In this manner, the flanges are provided with annular shoulders $9^b$ adapted to embrace the lateral edges of the steel band 3.

The flanges 9 and $9^a$ of the clamping-rims C and C' are provided with registering perforations 10 through which the clamping-bolts 6 extend.

The base-ring 4 of the tire is considerably larger in diameter than the band 3 of the felly, the space being sufficient to enable the annular clamping-members C and C' to be interposed, as shown in Fig. 2. When the bolts are tightened, the clamping-rims are wedged securely between the tire-base 4 and the rim 3 of the felly, and the annular shoulders $9^b$ are at the same time brought firmly into engagement with the lateral edges of the steel band 3.

By making the clamping-rim C and C' of channel-form cross-section, the clamping-rims are suitably lightened. At the same time, as will be understood from Fig. 2, the flanges 9 and $9^a$ afford annular walls interposed between the tire-base and the wheel-center, so that the tire is amply backed and supported on the wheel-center.

It is possible, by means of this construction, to exert a wedging action of tremendous force between the rim 3 of the wheel-center and the base 4 of the tire, so that the possibility of relative action between the parts is obviated. Moreover, the construction provides for bearings extending substantially completely across the inner surface of the tire-base. A space 11 is left between the clamping-rims to enable the annular shoulders $9^b$ to be drawn tightly against the lateral edges of the rim 3 of the wheel-center. The bevels between the tire-base and clamping-rims preferably make only very small angles with reference to the horizontal.

While each clamping-rim is shown as a complete annulus, the invention is not limited to this feature.

The foregoing detailed description has been given for clearness of understanding only, and no unnecessary limitations should be understood therefrom, but the appended claims should be construed as broadly as permissible, in view of the prior art.

What I regard as new, and desire to secure by Letters Patent, is:

1. In combination, a wheel-center, an encircling tire having an annular base provided with inner conical surfaces extending substantially to the center plane of the wheel-center, a pair of complemental clamping-rims interposed between said base and the wheel-center, said clamping-rims having outer conical surfaces and having inturned flanges engaging the circumferential portion of the wheel-center, the outer flanges of said clamping-rims having annular shoulders adapted to engage the lateral edges of the wheel-center, and an annular series of bolts extending through perforations with which the flanges of said clamping-rims are provided and serving to wedge the clamping-rims between the tire-base and the wheel-center.

2. In combination, a wheel-center; an encircling tire having an annular base separated by an annular space from the rim portion of the wheel-center; a pair of complemental clamping-rims in said annular space, each of said rims having a web-portion engaging the tire-base and having inner flanges disposed near the central plane of the tire and engaging the rim portion of the wheel-center and having outer flanges having shoulders engaging the circumferential surface of the rim portion of the wheel-center and shoulders engaging the lateral surfaces of the rim portion of the wheel-center; and an annular series of bolts extending through perforations in said flanges and connecting said clamping-rims.

WILLIAM C. MARTIN.